May 3, 1960     D. D. BRYANT     2,935,344
SNAP-ON DUSTGUARD OIL SEAL
Filed Jan. 20, 1959     4 Sheets-Sheet 1
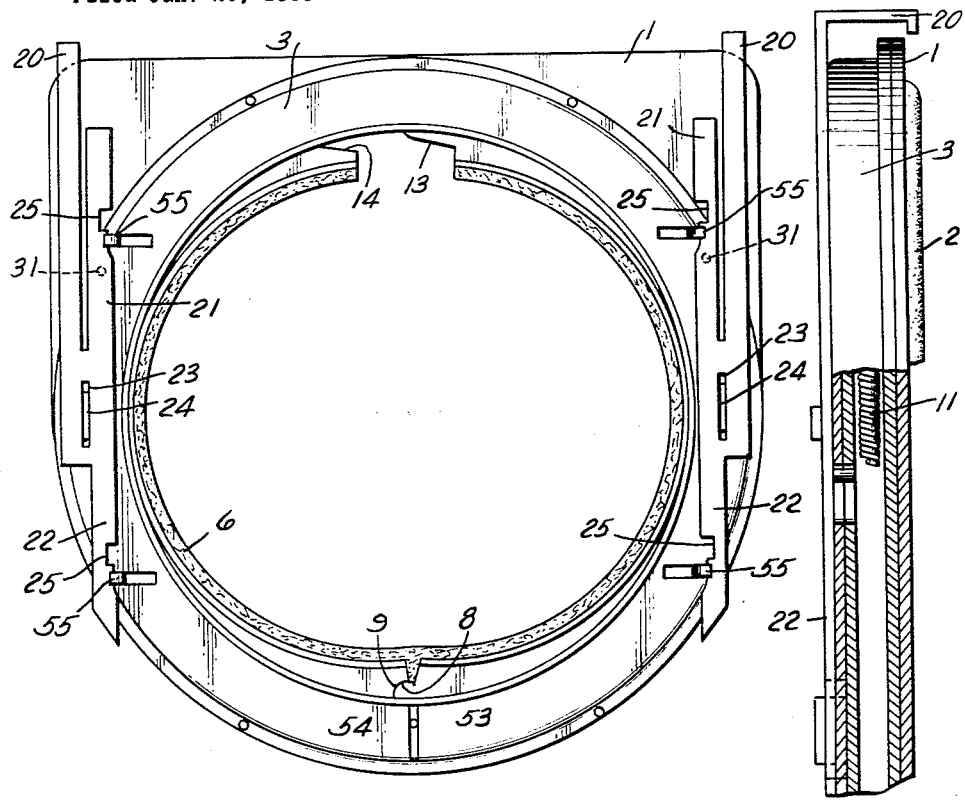
Fig.2
Fig.3
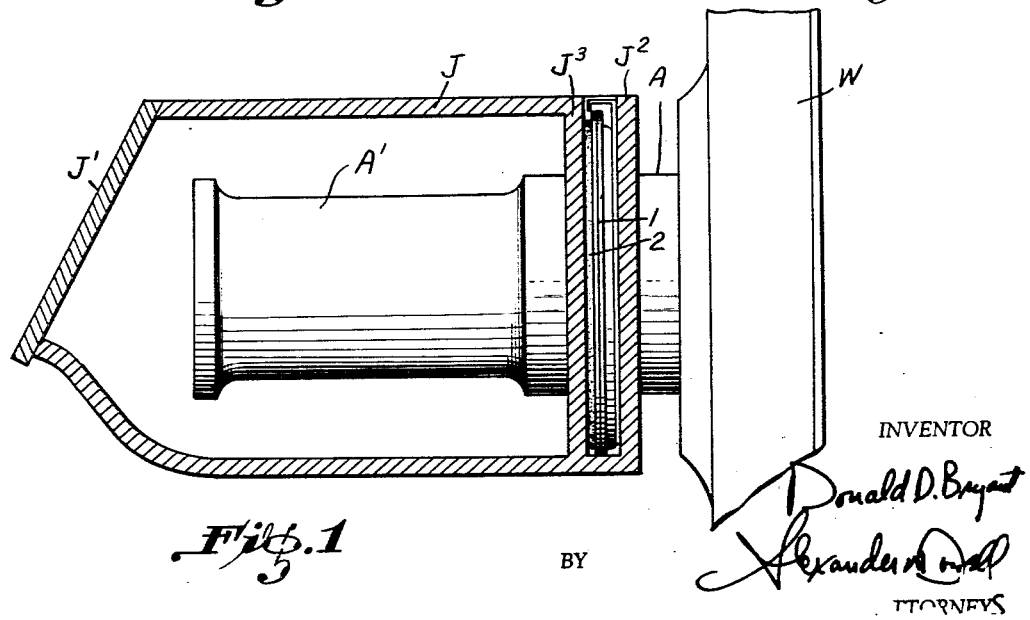
Fig.1
INVENTOR
Donald D. Bryant
BY Alexander [illegible]
ATTORNEYS May 3, 1960
D. D. BRYANT
2,935,344
SNAP-ON DUSTGUARD OIL SEAL
Filed Jan. 20, 1959
4 Sheets-Sheet 2
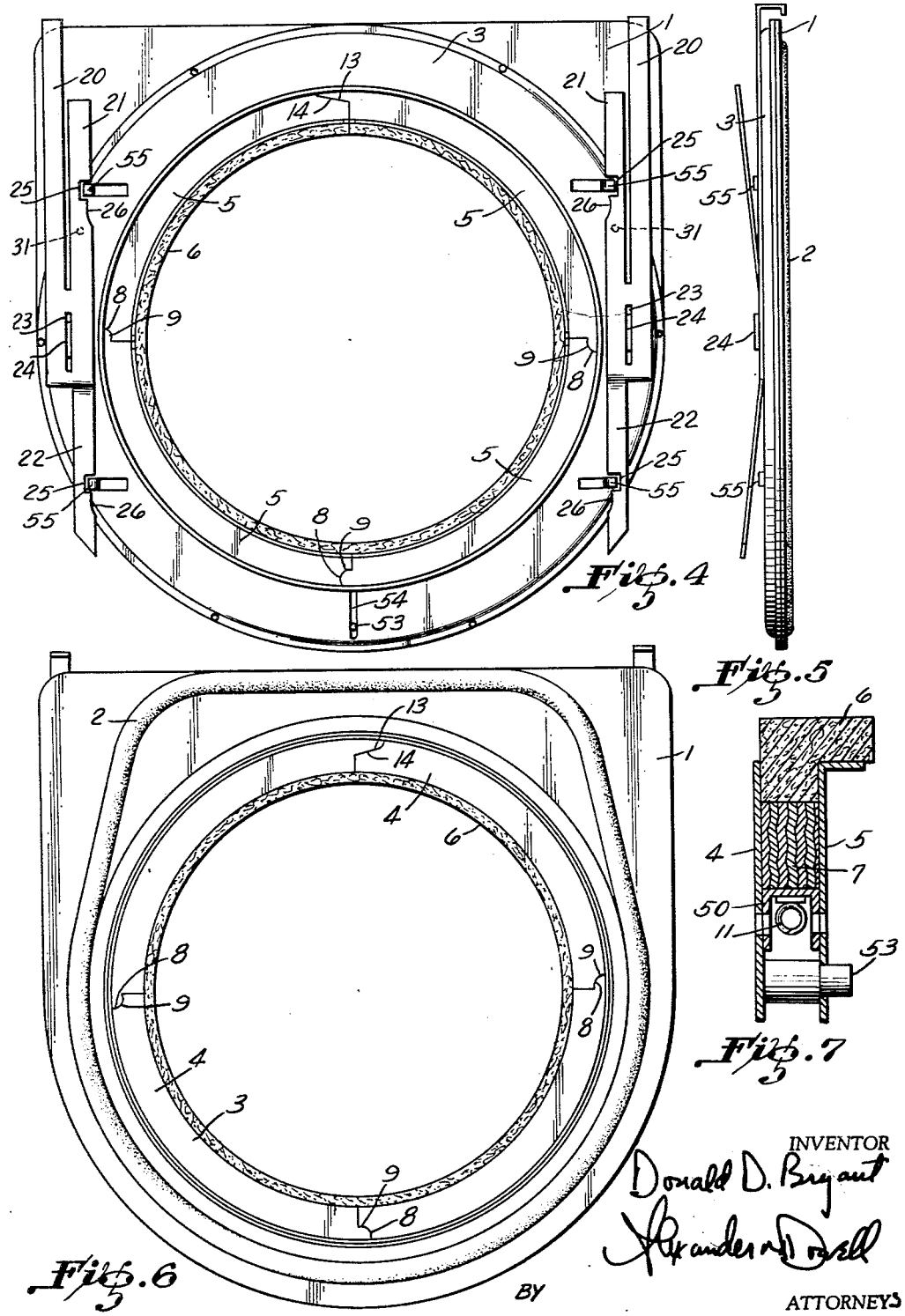

May 3, 1960     D. D. BRYANT     2,935,344
SNAP-ON DUSTGUARD OIL SEAL
Filed Jan. 20, 1959     4 Sheets-Sheet 3
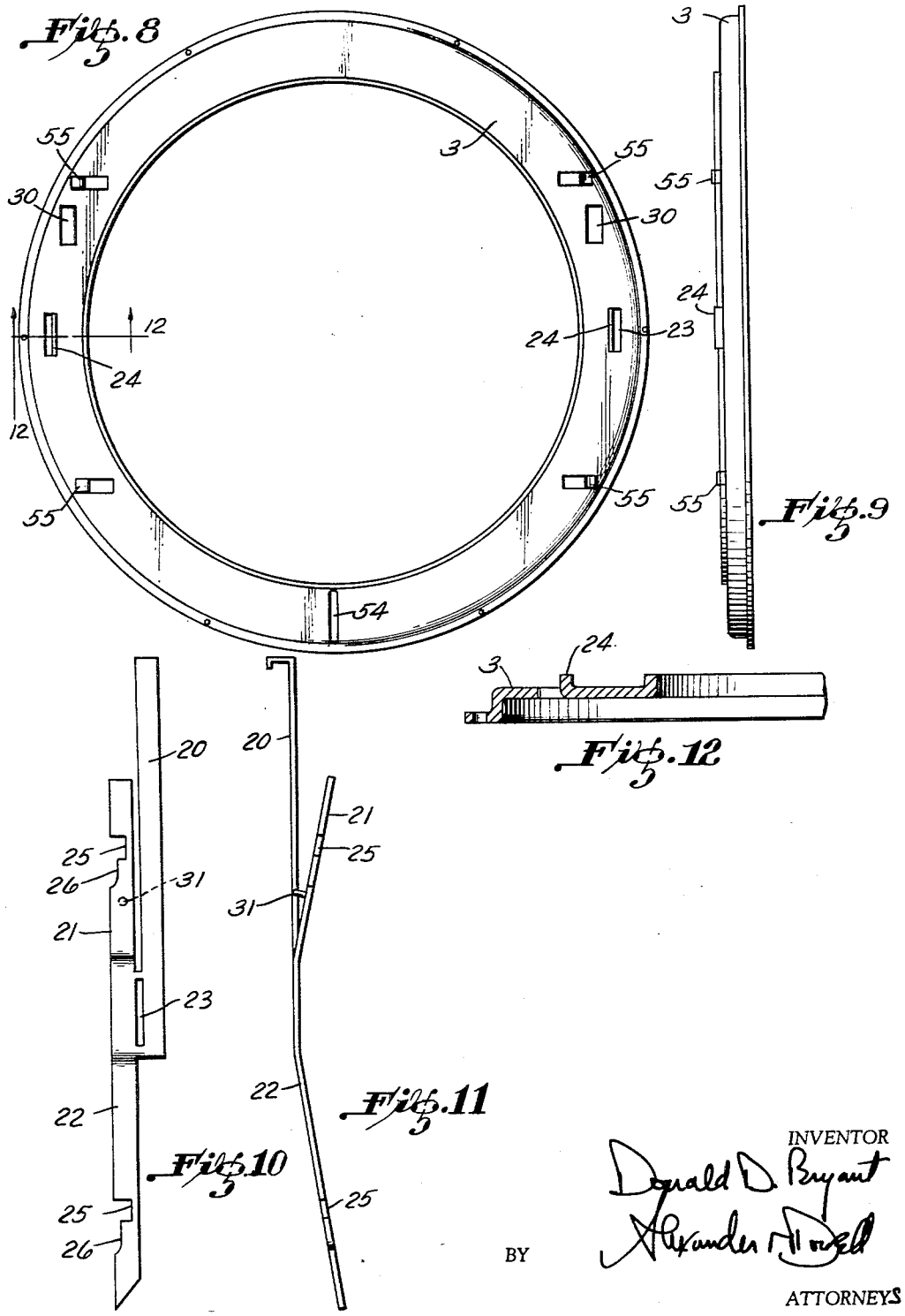
INVENTOR
Donald D. Bryant
Alexander Dowell
BY
ATTORNEYS

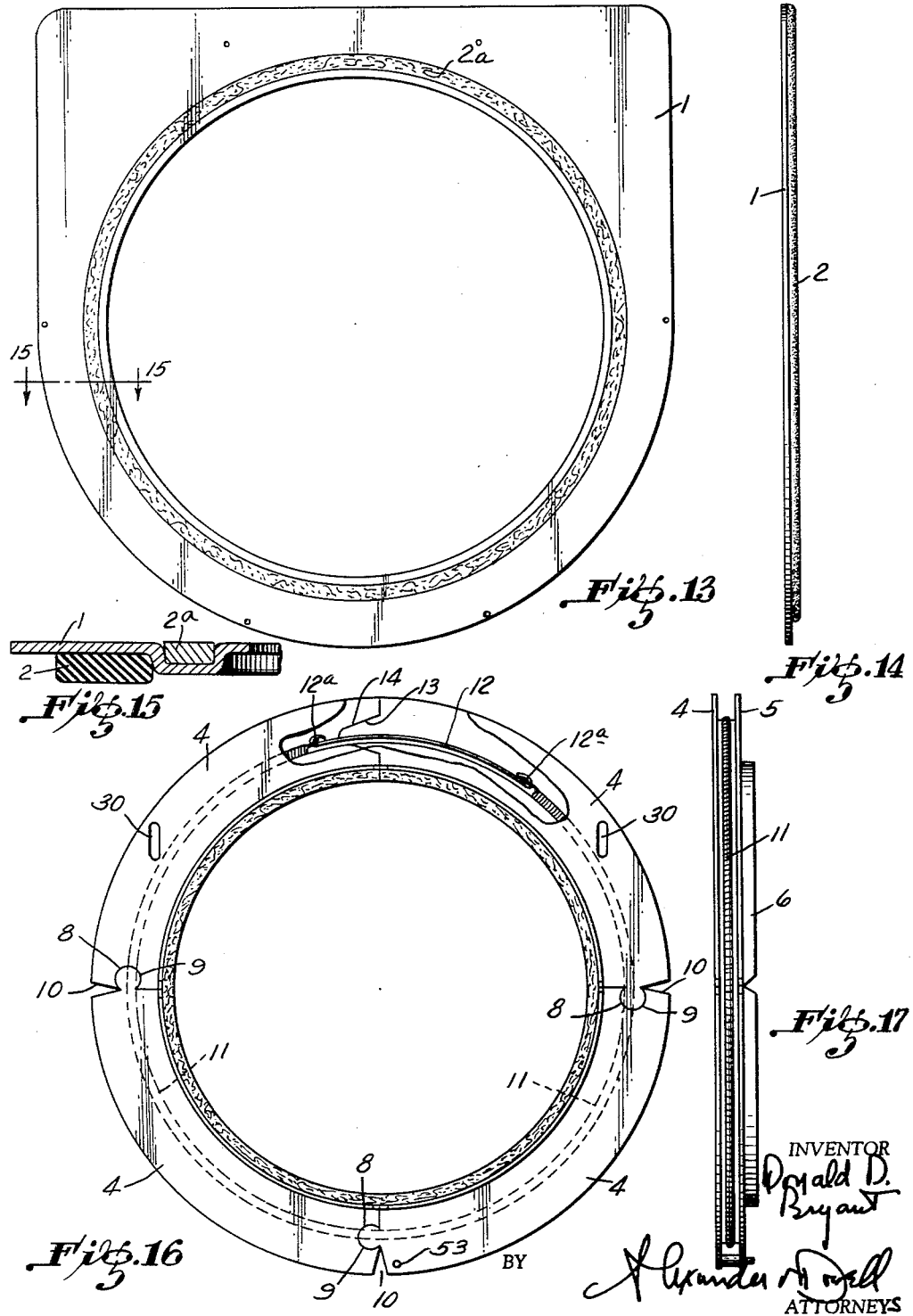

United States Patent Office
2,935,344
Patented May 3, 1960

2,935,344

SNAP-ON DUSTGUARD OIL SEAL

Donald D. Bryant, Huntington, W. Va.

Application January 20, 1959, Serial No. 788,000

15 Claims. (Cl. 286—6)

This invention is a novel improvement in snap-on dustguards and oil seals for journal boxes for railroad cars or the like, and the principal object thereof is to provide a snap-on dustguard and oil seal for such journal boxes having means for intially holding expanded the dustguard band within the recess of the journal box while the journal portion of the axle is being inserted through the dustguard band into the journal box, said means having yieldable members operable therewith and maintained inoperative while the dustguard is thus expanded, but when the means is actuated to permit contraction of the dust guard band around the journal portion of the axle said yieldable means will be activated to urge the dustguard against one face of the recess in the journal box to prevent leakage of oil along the journal portion of the axle into the recess of the journal box between the dustguard and the said one face of said recess.

Other objects of the invention are to provide, means to lock a snap-on sealing band open for journal application or clearance; also means to snap on an oil seal band around the axle journal in a dustguard recess of a journal box; also means to self-adjust an oil seal band around the axle journal; also means to allow an oil seal band to float with the axle journal movement; also means to seal an oil seal band surface against the stationary surface of a journal box; also means to extend the axle contact surface of the oil seal band closer to the wheel so that the seal will remain on the axle section during lateral motion of axle and wheels; also means to secure a pliable, flexible, self-adjusting oil seal band in a locked (open and closed) section of a slidable retaining band; also means to close the retaining band so as to seal both the band journal contact surface and the band slidable side surface against loss of oil; also means to allow the oil band to flex with shock on lateral action of the journal; also means to seal a journal box cavity from loss of oil when car is being dumped; and also means to freely enter an oil seal into the dustguard section of a journal box casting; and means to expand the seal so it will seal the box against loss of oil when the car is in transit or being dumped.

Other minor objects of the invention will be hereinafter set forth.

I will explain the invention with reference to the accompanying drawings, which illustrate several practical imbodiments thereof, to enable others familiar with the art to adopt and use the same; and will summarize in the claims, the novel features of construction, and novel combination of parts, for which protection is desired.

In said drawings:

Fig. 1 is a longitudinal section through a journal box of typical form showing the axle journal situated therein; also showing the open recess for the dustguard inserted in said open recess, and showing the wheel which is mounted upon said axle;

Fig. 2 is an enlarged plan rear view showing the dustguard detached, and showing the parts of the dustguard band maintained in open position prior to insertion therethrough of the journal portion of the axle;

Fig. 3 is an end view, partly in section, of the parts shown in Fig. 2;

Fig. 4 is a rear view similar to Fig. 2 but showing the parts in position wherein the dustguard band is contracted around the journal portion of the axle;

Fig. 5 is a side elevation of the parts shown in Fig. 4;

Fig. 6 is a front view of the dustguard showing the parts in the position in which the band is contracted around the journal portion of the axle;

Fig. 7 is an enlarged detail sectional view through the dustguard band;

Fig. 8 is a view of the cover plate disclosed in Fig. 2;

Fig. 9 is a side view of the cover plate shown in Fig. 8;

Fig. 10 is an enlarged view of the pressure spring disclosed in Figs. 2 and 4;

Fig. 11 is a side view of said pressure spring shown in Fig. 10;

Fig. 12 is an enlarged detail view on the line 12—12, Fig. 8;

Fig. 13 is a plan view of the front plate showing the gasket applied thereto;

Fig. 14 is a side elevation of the plate shown in Fig. 13;

Fig. 15 is an enlarged section on the line 15—15, Fig. 13;

Fig. 16 is a plan view, partly broken away, showing the floating band and its contracting spring in the contracted position; and Fig. 17 is a side elevation of the floating band shown in Fig. 16.

As shown in the drawings, my novel snap-on dustguard and oil seal is adapted to be mounted in the dustguard recess of a standard journal box (Fig. 1), the axle A having a journal portion A' and a wheel W, the axle portion A' being adapted to be inserted through the rear end of the journal box J, which journal box may be equipped with the usual cover plate J' at its outer end, and having at its inner end a dustguard recess bounded by the rear plate 12 of the journal box J and by a spaced parallel inner plate J3, said plates J2 and J3 having coaxial circular openings therein which are of greater diameter than the journal portion A' of the axle A, in order that the journal portion A' may be inserted into the journal box J through the openings in plates J2 and J3 into normal position within the journal box. The particular means or method of mounting the axle portion A' within the journal box J forms no part of my present invention. As shown in Fig. 1, the top of the journal box recess, between the plates J2 and J3, is open in the usual manner, in order that a dustguard or oil seal may be inserted downwardly therein to surround the axle A.

My invention is a novel snap-on dustguard and oil seal which may be inserted downwardly within the recess in journal box J, between plates J2 and J3, in order to prevent the oil or other lubricant within journal box J from escaping along the axle A between the journal box J and wheel W.

As shown, my novel snap-on dustguard and oil seal comprises a face plate 1 of same general shape but slightly smaller than the dustguard recess in journal box J, said face plate 1 being insertable down into the recess in journal box J, and having on its face for contact with the wall J3 of the journal box recess a gasket 2 adapted to surround the opening in wall J3 for the axle portion A', said gasket 2 preventing leakage of oil from journal box J radially of wall J3, when the plate is inserted in the dustguard recess of the journal box.

Between face plate 1, and a substantially circular cover plate 3 is a floating band which is preferably formed in sections, four such sections being shown in Fig. 16, each section comprising parallel arcuate plates 4 and 5, Fig. 7, which are secured together in spaced relation by U-shaped clips 50, the plates 4 and 5 carrying at their inner ends resilient material shoes 6, Fig. 7, to engage the axle portion A of the axle, the inner ends of the shoes 6 bearing upon a laminated cardboard filler 7 (Fig. 7) so that the shoes 6 will be normally urged against the axle portion A of the axle, when the parts are in normal position. The sections embraced between the plates 4 and 5 make a sliding fit between face plate 1 and cover plate 3, so that the sections confined between the plates 1 and 3 may shift relatively to the plates 1 and 3 to accommodate movements of the axle A within the journal box J while maintaining an effective oil seal between the plates 4—5 of the sections and said plates 1—3.

As shown in Fig. 16, three of the floating bands carry parti-circular heads 8 adapted to engage parti-circular recesses 9 in the adjacent band sections, the shoulders between the adjacent sections being cut away as at 10 so that the band sections may be permitted to enlarge beyond the diameter of the section A of the axle, for the purpose hereinafter described.

The outer peripheries of the band sections 4—5 are grooved to receive an endless tension spring 11 (Figs. 16 and 17), whereby the sections will normally be yieldably contracted by spring 11 around the axle section A, the ends of the spring 11 being connected together by a member 12 (Fig. 16) having its ends 12a respectively connected to the ends of the spring 11. Thus the sections of the floating band will be normally yieldably contracted around the axle section. In way of member 12 one band section 4—5 is provided with a tongue 13 adapted to fit within a correspondingly shaped recess 14 on the adjacent band, thus permitting the sections to separate, but when the sections are contracted the same will form a circular band around the axle section A.

Diametrically opposite the parts 13 and 14, on one section, is a pin 53 slidably engaging a radial slot 54 in cover plate 3 to prevent rotational movement of the band sections 4—5 with respect to face plate 4 and cover plate 3.

The periphery of cover plate 3 may be welded or otherwise secured to face plate 1 with the floating band 4—5 inserted therebetween, the floating band 4—5 being capable of free orientation about the axis of the plates 1 and 3, so that axle A, when the vehicle is moving may orient freely with respect to the axis of the openings in the recess in journal box J while the floating band is contracted around the axle portion A.

While the axle portion A is being inserted through the dustguard and through the openings in the recess of journal box J, it is necessary that the floating band 4—5 be maintained in expanded position to permit entry of the axle section A therethrough, while the dustguard is positioned in the recess of the journal box. This is effected by providing strips shown more particularly in Figs. 2, 4, 10 and 11, which are initially utilized with the dustguard when the axle section A is being inserted into journal box J.

As shown, the strips preferably comprise metal members 20 having offset portions 21, 22, elongated slots 23 being provided in the offset portions into which fins 24 extend, said fins being struck-out of the metal of cover plate 3, as shown more particularly in Figs. 8, 9 and 12, which fins 24 serve as guides for the strips 20—21—22, which are reciprocable or slidable on cover plate 3.

The portions 21, 22 of the strips are normally flexed or bowed, as shown more particularly in Fig. 11. However, when inserting the dustguard into the recess in the journal box J, the portions 21, 22 of the springs are normally held substantially parallel with cover plate 3 by means of headed lugs 55 on cover plate 3 which engage the outer face of the bowed portions 21, 22, through notches 25 in the portions 21, 22, so that when the strips 20 are pulled upwardly with respect to face plate 1, the headed lugs 55 will engage cam portions 26 of the springs 21, 22, and thereby hold the spring portions 21, 22, substantially parallel with the outer face of cover plate 3. When, however, the strips 20 are pushed downwardly with respect to the top of face plate 1, the headed lugs 55 will enter the recessed portions 25 of the springs 21, 22, thereby permitting the spring portions 21, 22 to bow outwardly, thus pushing the dustguard laterally within the journal box recess so that the gasket 2 of face plate 1 will engage the inner wall J3 of the journal box recess, to prevent leakage of oil along the axle A between the plate 1 and the wall J3.

As shown in Fig. 16, the sections of the floating band 4—5 adjacent the joint 13, 14 are provided with slots 30 which are engaged by pins 31 on the members 21 of the springs, which pins 31 when so engaged maintain the split end of the floating band 4—5 separated while the spring portions 21, 22 are held substantially in the same plane as the face of cover 3. When the axle section A has been inserted through the expanded dustguard in the recess of the journal box, and the ends of the strips 20 forced downwardly with respect to the top of face plate 1, the disengagement of the pins 31 from the slots 30 will permit the open end of the sectionalized floating band 4—5 to contract around the axle portion A, and simultaneously will permit the bowed springs 21, 22 of the strips 20 to press the gasket 2 of face plate 1 against the wall J3 of the journal box recess, thereby preventing leakage of oil from the journal box between J3 of the journal box and gasket 2 along the axle section A, which would otherwise be dissipated or lost.

I do not limit my invention to the exact forms shown in the drawings, for obviously changes may be made therein within the scope of the claims.

I claim:

1. In combination with a journal box receiving a wheeled axle and having a dustguard receiving recess therein including spaced walls provided with axial openings therein of greater diameter than the axle, said recess being open at the top; a dustguard unit comprising spaced parallel plates; a split dustguard band making a sliding fit between said plates and having means thereon for yieldably urging the band to completely surround the said axle; one plate having on its exterior face a gasket surrounding the axle and adapted to engage one wall of said recess; and common means slidably carried by one of said plates and having devices thereon adapted in one position to hold the split end of the band apart while the axle is being inserted into the journal box, said means having yieldable means thereon for pressing the gasket into engagement with a wall of the recess, on other devices, said yieldable means held inoperative while the split end of the band is held apart, but adapted when the said common means is shifted into another position to permit closing of the split end of the band to permit same to encircle the axle, and simultaneously to release the yieldable means to urge the said gasket into engagement with said wall of the recess.

2. In a combination as set forth in claim 1, said dustguard band being formed of sections, each section carrying on its inner face a resilient shoe for engagement with the said axle; means for articulating the sections together; and said surrounding means comprising an endless resilient member under tension disposed around the said sections for normally contracting the band around the axle.

3. In a combination as set forth in claim 2, a pin on the section opposite the split engaging a radial slot in one plate for preventing rotation of the band within the plates while permitting limited vertical and lateral movements with respect thereto.

4. In a combination as set forth in claim 1, said dustguard band being formed of sections comprising spaced arcuate plates secured together in parallel relation, each section carrying on its inner face a resilient shoe for engagement with the said axle; means for articulating the sections together; said surrounding means comprising an endless resilient member under tension disposed around the said sections for normally contracting the band around the axle; said spaced arcuate plates being held apart by clips; and laminated absorptive fillers interposed between the said shoes and clips.

5. In a combination as set forth in claim 1, said common means comprising slidable strips on one plate at opposite sides thereof extending above the said plate, and having at their lower ends offset bowed spring portions; said devices comprising interengaging means on the bowed spring portions and on the plate whereby when the strips are in one position the bowed spring portions will be maintained substantially parallel with the said plate; and said other devices comprising means on the bowed spring portions engaging means in the band adjacent the split; whereby when the strips are in said one position the split ends of the band will be held separated while the bowed springs are maintained inoperative, but when the strips are in another position after the axle is inserted into the journal box the split ends of the band will be released for contraction around the axle while simultaneously the bowed springs will be released to urge the gasket into contact with the said wall of said recess.

6. In combination with a journal box receiving a wheeled axle and having a dustguard receiving recess therein including spaced walls provided with axial openings therein of greater diameter than the axle, said recess being open at the top; a dustguard unit comprising a front plate; a cover plate secured thereto, in parallel spaced relation; a split dustguard band making a sliding fit between said front and cover plates and having means for yieldably urging the band to completely surround the said axle; said front plate having on its exterior face a gasket surrounding the axle and adapted to engage one wall of said recess; and common means slidably carried by the cover plate and having devices thereon adapted in one position to hold the split end of the band apart while the axle is being inserted into the journal box, said means having yieldable means thereon for pressing the gasket carrying face of the front plate into engagement with the adjacent wall of the recess, and other devices on said yieldable means held inoperative while the split end of the band is held apart, but adapted when the said common means is shifted into another position to permit closing of the split end of the band to permit the band to encircle the axle and simultaneously to release the yieldable means to urge the said gasket into engagement with the said wall of the recess.

7. In a combination as set forth in claim 6, said dustguard band being formed of sections comprising spaced arcuate plates secured together in parallel relation, each section carrying on its inner face a resilient shoe for engagement with the said axle; means except at the split for articulating the sections together; and said surrounding means comprising an endless resilient member under tension disposed around the said sections for normally contracting the band around the axle.

8. In a combination as set forth in claim 6, said dustguard band being formed of sections comprising spaced arcuate plates secured together in parallel relation, each section carrying on its inner face a resilient shoe for engagement with the said axle; means except at the split for articulating the sections together; and said surrounding means comprising an endless resilient member under tension disposed around the said sections for normally contracting the band around the axle; said spaced arcuate places being held apart by U-shaped clips; and laminated absorptive fillers interposed between the said shoes and clips.

9. In a combination as set forth in claim 6, said common means comprising slidable strips on the cover plate at opposite sides thereof extending above the front plate, and having at their lower ends offset bowed spring portions; said devices comprising lugs of the cover plate slidably engaging slots in the strips for permitting vertical movement of the strips; notches in the edges of the bowed spring portions for the reception of headed lugs on the cover plate whereby when the strips are in one position the bowed spring portions will be maintained by the headed lugs substantially parallel with the cover plate; and pins on the bowed spring portions extending into slots in the sections of the band adjacent the split; whereby when the strips are in said one position the split ends of the band will be held separated while the bowed springs are maintained inoperative, but when the strips are in another position the split ends of the band will be released for contraction around the axle, while simultaneously the bowed springs will be released to urge, after the axle is inserted into the journal box, the gasketed front face into contact with the said wall of said recess.

10. A dustguard unit for the purpose specified, comprising a front plate; a cover plate secured thereto in parallel spaced relation; said plates having aligned axle openings therein; a split dustguard band making a sliding fit between said plates and having means for yieldably urging the band to contract around an axle; said front plate having on its exterior face a gasket surrounding the opening; and common means slidably carried by the cover plate and having devices thereon adapted in one position to hold the split end of the band apart, said means having yieldable means thereon for pressing the gasket carrying face of the front plate laterally of and other devices on said axle, said yieldable means held inoperative while the split end of the band is held apart; but adapted when the said means is shifted into another position to permit closing of the split end of the band and simultaneously to activate the yieldable means to urge the said gasket carrying face laterally.

11. In a unit as set forth in claim 1, said dustguard band being formed of sections comprising spaced arcuate plates secured together in parallel relation, each section carrying on its inner face a resilient shoe for engagement with the said axle; means except at the split for articulating the sections together; and said surrounding means comprising an endless resilient member under tension disposed around the said sections for normally contracting the band around the axle.

12. In a unit as set forth in claim 11, a pin on the section opposite the split engaging a radial slot in the cover plate for preventing rotation of the band within the front and cover plates while permitting limited vertical and lateral movements with respect thereto.

13. In a unit as set forth in claim 10, said dustguard band being formed of sections comprising spaced arcuate plates secured together in parallel relation, each section carrying on its inner face a resilient shoe for engagement with the said axle; means except at the split for articulating the sections together; and said surrounding means comprising an endless resilient member under tension disposed around the said sections for normally contracting the band around the axle; said spaced arcuate plates being held apart by U-shaped clips; and laminated absorptive fillers interposed between the said shoes and clips.

14. In a unit as set forth in claim 10, said common means comprising slidable strips on the cover plate at opposite sides thereof extending above the front plate, and having at their lower ends offset bowed spring portions; said devices comprising lugs on the cover plate slidably engaging slots in the strips for permitting vertical movement of the strips; notches in the edges of the bowed spring portions for the reception of headed lugs on the cover plate whereby when the strips are in one position the bowed spring portions will be maintained by the headed lugs substantially parallel with the cover plate; and pins on the bowed spring portions extending into slots in the sections of the band adjacent the split; whereby when the strips are in said one position the split ends of the band will be held separated while the bowed springs are maintained inoperative, but when the strips are in another position the split ends of the band will be released for contraction around the axle, while simultaneously the bowed springs will be released to urge the gasketed front face laterally.

15. A dustguard unit, comprising a front plate; a cover plate secured thereto in parallel spaced relation; a split oil-seal band making a sliding fit between said front and cover plates and having means for yieldably urging the band to contract around an axle; said front plate having on its exterior face a gasket surrounding the opening; and common means slidably carried by the cover plate and adapted in one position to hold the split end of the band apart, said means having yieldable means thereon for pressing the gasket carrying face of the front plate laterally of said axle; said common means comprising strips on the cover plate at opposite sides thereof extending above the front plate, and having at their lower ends offset bowed spring portions; lugs on the cover plate slidably engaging slots in the strips for permitting vertical movement of the strips; notches in the edges of the bowed spring portions for the reception of headed lugs on the cover plate, whereby when the strips are in one position the bowed spring portions will be maintained by the headed lugs substantially parallel with the cover plate; and pins on the bowed spring portions extending into slots in the sections of the band adjacent the split; whereby when the strips are in said one position the split ends of the band will be held separated while the bowed springs are maintained inoperative, but when the strips are in another position the split ends of the band will be released for contraction around the axle, while simultaneously the bowed springs will be released to urge the gasketed front face laterally of the axle.

References Cited in the file of this patent
UNITED STATES PATENTS

| | | |
|---|---|---|
| 2,054,017 | Armstrong et al. | Sept. 8, 1936 |
| 2,257,119 | Johannesen | Sept. 30, 1941 |
| 2,638,363 | Bryant | May 12, 1953 |
| 2,688,503 | Hennessy | Sept. 7, 1954 |